July 2, 1968  J. J. McCARTHY  3,390,874
TELESCOPIC STRUT
Filed Aug. 12, 1966
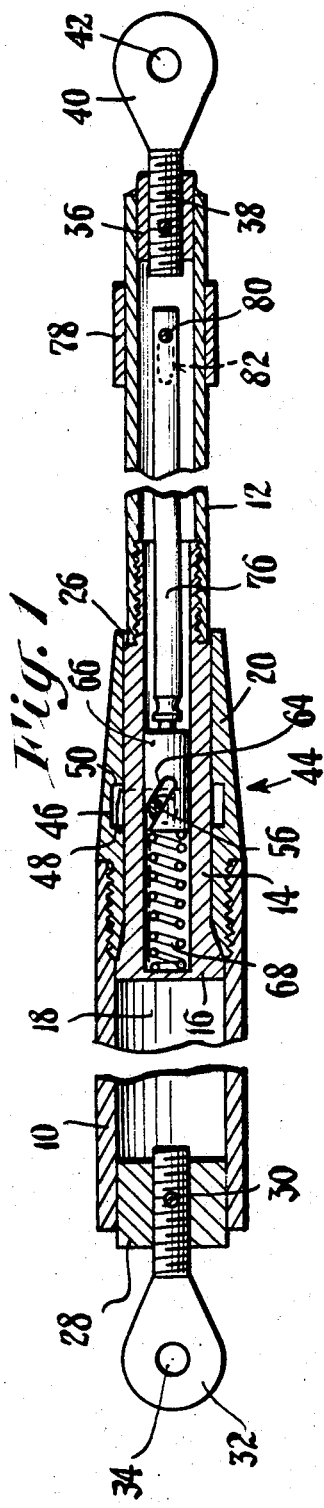
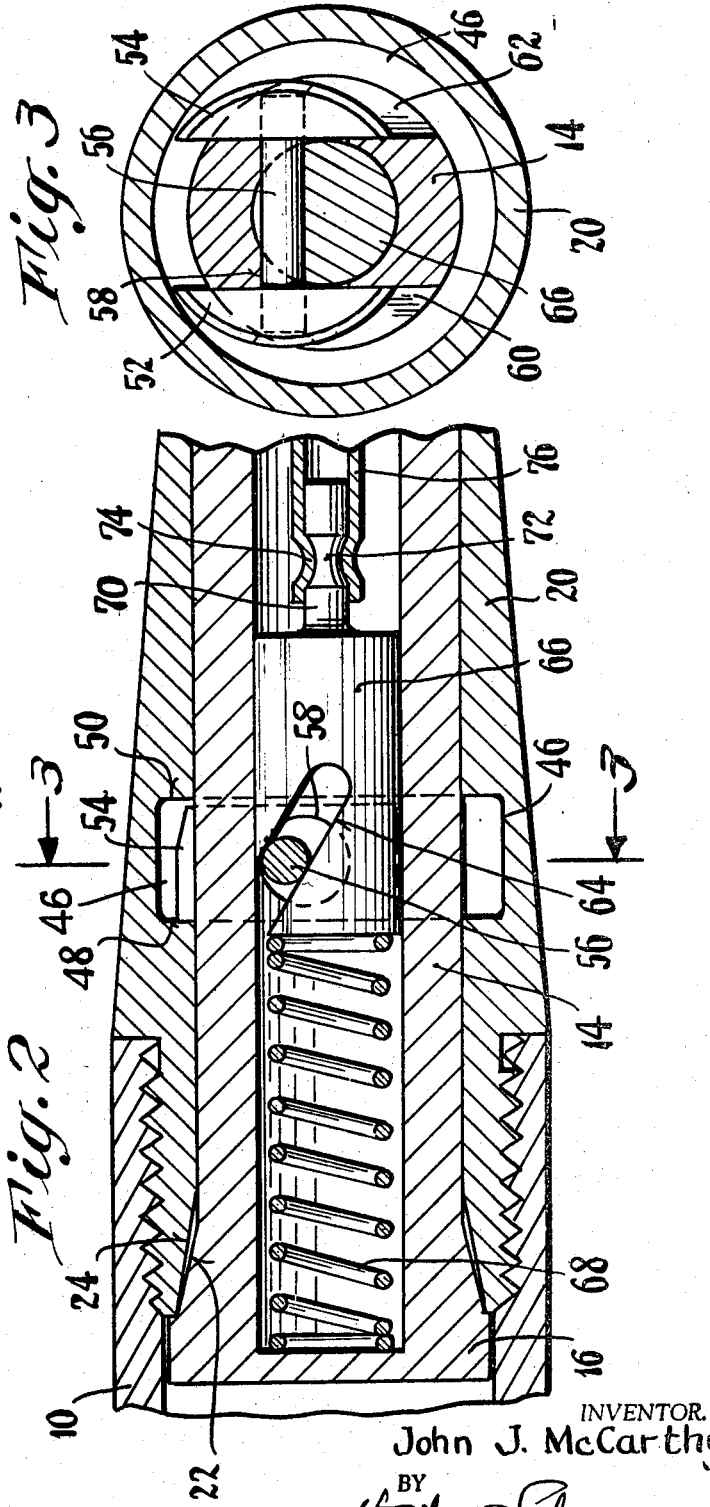
INVENTOR.
John J. McCarthy
BY
AGENT

# United States Patent Office 3,390,874
Patented July 2, 1968

3,390,874
TELESCOPIC STRUT
John J. McCarthy, Weston, Conn., assignor to Norco, Inc., Ridgefield, Conn., a corporation of Connecticut
Filed Aug. 12, 1966, Ser. No. 572,074
7 Claims. (Cl. 267—69)

ABSTRACT OF THE DISCLOSURE

A retractable and extendable strut comprising inner and outer tubular teelscopically fitting members, the inner member having a shiftable release sleeve at its end remote from the outer member and having within the outer member a latching piece actuatable by the release sleeve and engageable with shoulder means inside the outer member, to lock the members in relative extended positions.

---

This invention relates to extensible and retractable struts, and more particularly to struts of this type, which are constituted of telescopic sections.

Objects of the invention are: to provide a novel and improved telescopic strut of the extensible and retractable type, wherein the extension and locking of the strut may be easily and quickly effected by the simple act of forcing the telescopic sections apart or in relative opposite directions; to provide an improved strut as above set forth, wherein a positive and reliable lock is had in the extended position; to provide an improved strut as characterized, wherein the latching mechanism and working parts are wholly enclosed and protected; to provide a strut in accordance with the foregoing which may be easily and quickly unlocked or released and thereafter retracted, which is foolproof, rugged and reliable in operation, strong and durable, not likely to malfunction, yet simple and economical to fabricate.

Other features and advantages will hereinafter appear.

In the drawings:

FIG. 1 is a longitudinal sectional view of the present improved strut, shown in extended position.

FIG. 2 is a fragmentary section of the strut, enlarged to reveal details more clearly.

FIG. 3 is a transverse section, taken on line 3—3 of FIG. 2.

Referring now particularly to the figures, the telescopic extensible strut as provided by the invention comprises outer and inner tubular members 10, 12 which telescopically slidably fit one within the other, the inner member 12 including a cylindrical tubular head 14 having a larger peripheral end portion 16 which slidably engages the bore or inner wall surface 18 of the outer member 10. Also, the outer strut member 10 has a tubular end fitting 20 in which the head 14 is receivable, and to which it may be locked when the strut is in the extended position as shown in FIG. 1.

The bore of the end fitting 20 is very slightly larger than the outside diameter of the inner telescopic member 12 whereby these may have an easy sliding fit, and this same is true of the fitting 20 and the major portion or length of the head 14 with the exception of the enlarged peripheral end portion 16. The head 14 has a conical outer surface 22 extending between the peripheral end portion 16 and the cylindrical remainder or body of the head 14, constituting a stop which is engageable with a corresponding inner conical surface 24 disposed at the inner end of the fitting 20.

As shown, the outer telescopic member 10 may be internally threaded at the end adjacent the fitting 20, and the latter may be correspondingly externally threaded to provide for attachment of the fitting to the strut member.

Also, the end of the inner strut member 12 which is adjacent the head 14 may be internally threaded, and the said head may be correspondingly externally threaded to provide for attachment of the head to the inner strut member.

Preferably, as shown, the exposed periphery of the end fitting 20 is slightly tapered, forming a frusto-conical exterior surface whereby the exposed end or lip 26 of the fitting is of smaller size and does not jut out from the exterior of the inner strut member 12 to any great extent.

Also preferably, as illustrated in FIG. 2, the angle of taper of the conical surface 22 is slightly greater than the angle of taper of the conical surface 24 whereby a slight space exists between said conical surfaces when the head 14 is in full engagement with the end fitting 20, as in FIG. 1. This will tend to prevent binding or wedging of the head 14 in the fitting 20, and facilitates the separation of these parts when the strut is to be collapsed or retracted.

The head 14 and end fitting 20 thus serve to connect the juxtaposed ends of the telescopic members 10, 12 when the strut is in the extended position shown in FIG. 1.

The remote end of the outer strut member 10 has a plug 28 rigidly affixed to it, in which there is secured the shank 50 of a pivotal fitting or connector 32 having a bore 34 to receive a pivot pin. Likewise, the remote end of the inner telescopic member 12 has rigidly affixed to it an end plug 36 in which there is secured the shank 38 of a fitting or connector 40 having a bore 42 to receive a pivot pin.

In accordance with the present invention, the head 14 and the end fitting 20 are so organized and arranged as to constitute cooperable latch means by which the telescopic strut members 10, 12 may be locked to each other in the extended position of FIG. 1 by the simple act of forcing the said members apart or in relative opposite directions. Moreover, a simple, quick and easy release of the locked strut members is had at will, enabling the strut to be quickly collapsed or retracted when this is desired.

Accordingly, the end fitting 20 is provided with an internal locking shoulder and recess formation indicated generally by the numeral 44, said formation being formed by the provision of an internal annular groove 46 having planar side walls 48, 50 normal to the strut axis. Cooperable with the shoulder and recess formation 44 is a latch piece comprising sector-shaped locking dogs 52, 54 connected rigidly to each other in spaced relation by a transverse pin 56 which is disposed in a transverse circular through-opening 58 provided in the head 14. In addition to the circular opening 58, the head 14 has oppositely disposed transverse slots 60, 62 in which the locking dogs 52, 54 are respectively disposed and slidable. The pin 56 occupies a cam slot 64 provided in a cam piece 66 which is longitudinally slidable in the bore of the head 14, being urged to the right as viewed in FIG. 1 by a helical compression spring 68. The cam 66 has a shank 70 having an annular groove 72 in which there is crimped the end portion 74 of a hollow actuator rod 76 extending through the inner telescopic member 12 to the remote end portion thereof. A release sleeve 78 is externally carried by the said remote end portion, being slidable thereon and having a diametric pin 80 passing through slots 82 in the member 12 and also through a hole in the end portion of the actuator rod 76.

The latch pieces 52, 54 are transversely movable in the head 14 between advanced or protruding positions as shown in the figures wherein they may occupy the annular groove 46 of the end fitting 20 to lock the fitting to the head 14, and retracted positions wherein they do not protrude from the head. It will be understood that movement of the actuator rod 76 from the right to the left will cause the cam 66 to act on the pin 56 so as to shift the latching pieces 52, 54 to the retracted positions wherein they do not occupy the annular groove 46 of the end fitting 20. When the pieces 52, 54 are advanced, the outer telescopic member 10 will be locked to the inner telescopic member 12 with said members in the extended positions wherein the strut has the maximum length.

By this invention, the latch pieces 52, 54 by engagement with the sloping surface 24 of the fitting 20 will be automatically cammed inward or shifted to the retracted position at the time that the strut members 10, 12 are being moved to their relative extended positions, that is, when the head 14 of the inner member is brought toward and into the end fitting 20 of the outer member. The automatic retraction thus effected of the latch pieces 52, 54 readies the said pieces for subsequent advance into the annular locking groove 46 as the pieces reach the same.

Thus, there is the advantage that the collapsible strut may be very easily and quickly shifted to and locked in its extended position without requiring special actuation of the locking pieces. At such time that the strut is to be again collapsed or retracted, this is easily and quickly effected by grasping the release sleeve 78 and shifting the same from right to left, whereupon the cam 66 will effect retraction of the latch pieces 52, 54, shifting these out of the locking groove 46. Thus, the telescopic members are unlocked, enabling these to be shifted to a retracted position wherein the inner member is substantially wholly contained in the outer member.

It will now be seen from the foregoing that I have provided a novel and improved telescopic strut of the extensible and retractable type wherein the extension and locking of the strut may be easily and quickly effected by the simple act of forcing the telescopic members or sections apart or in relative opposite directions. Positive and reliable locking of the strut sections is had in their extended positions. The latching mechanism and working parts are seen to be wholly enclosed and protected, and the strut may be easily and quickly unlocked and released and thereafter retracted when this is desired. The strut is foolproof and reliable in its operation, strong and durable and not likely to malfunction yet is simple and economical to fabricate.

Variations and modifications may be made within the scope of the claims, and portions of the improvement may be used without others.

I claim:

1. A retractable and extendable telescopic strut structure comprising, in combination:
   (a) outer and inner tubular strut members telescopically slidably fitting one within the other,
   (b) said outer member having an internal locking shoulder-and-recess formation adjacent one end,
   (c) a latch piece carried by and transversely movable in the inner member adjacent one end thereof, said piece being movable between an advanced protruding position wherein it is receivable in said shoulder-and-recess formation to lock the members together and a retracted non-protruding position disengaged from the shoulder-and-recess formation wherein the members are released for relative movement,
   (d) an actuator rod within the inner tubular member, said rod being longitudinally movable therein,
   (e) means including a cam on said actuator rod, for retracting said latch piece in response to movement of the rod in the inner member, thereby to release the members for relative movement, and
   (f) a sloping non-locking internal shoulder in the outer member, facing in a direction opposite to the locking shoulder of the said formation and engageable by the latch piece to automatically cam inward and retract the same in response to predetermined relative movement of the tubular members, said movement being in a direction which shifts the latch piece toward the locking shoulder-and-recess formation whereby the piece is readied for advance into the said locking shoulder-and-recess formation when it reaches the same.

2. A strut structure as in claim 1, wherein the latch piece has a bevelled edge to facilitate the camming of the piece inward.

3. A strut structure as in claim 1, wherein the inner strut member includes a head piece having a sloping surface engageable with the sloping shoulder of the outer strut member to constitute a stop and limit relative movement of the members in one direction.

4. A strut structure as in claim 3, wherein the sloping surface of the head piece has a larger angularity than the sloping shoulder of the outer strut member to minimize the likelihood of wedging of the strut members.

5. A strut structure as in claim 1, wherein the latch piece has a bevelled edge to facilitate the camming of the piece inward, said inner strut member including a head piece having a sloping surface engageable with the sloping shoulder of the outer strut member to constitute a stop and limit relative movement of the members in one direction.

6. A strut structure as in claim 1 wherein the inner strut member includes a cylindrical head piece having a transverse circular hole through it, said latch piece having a pin passing through and laterally movable in said circular hole, said pin being engaged by said cam.

7. A strut structure as in claim 1 wherein the inner strut member includes a cylindrical head piece having a bore in which the said cam is longitudinally movable; and a helical compression spring in the bore of said head, engaging said cam and biasing the same to normally maintain the latch piece in advanced position.

References Cited

UNITED STATES PATENTS

| | | | |
|---|---|---|---|
| 1,873,326 | 8/1932 | Ratigan | 287—58 |
| 2,907,598 | 10/1959 | Hart | 287—58 |
| 3,287,040 | 11/1966 | Verticchio | 287—58 |
| 3,306,127 | 2/1967 | Rieger | 287—58 |

ARTHUR L. LA POINT, *Primary Examiner.*

R. M. WOHLFARTH, *Assistant Examiner.*